United States Patent [19]

Besselink

[11] 3,997,312
[45] Dec. 14, 1976

[54] METHOD OF MANUFACTURING COLORED GLASS ARTICLES

[75] Inventor: Lucas Besselink, Eindhoven, Netherlands

[73] Assignee: U.S. Philips Corporation, New York, N.Y.

[22] Filed: Apr. 2, 1975

[21] Appl. No.: 564,306

Related U.S. Application Data

[63] Continuation of Ser. No. 418,080, Nov. 21, 1973, abandoned.

[30] Foreign Application Priority Data

Dec. 5, 1972  Netherlands ...................... 7216461

[52] U.S. Cl. .................................. 65/30 E; 65/31; 65/32; 106/54; 427/165; 427/309
[51] Int. Cl.² .................. C03C 15/00; C03C 17/26; C03C 21/00
[58] Field of Search ............ 65/30, 31, 32; 106/54; 427/165, 309; 428/410

[56] References Cited

UNITED STATES PATENTS

| 3,639,114 | 2/1972 | Loukes | 65/30 |
| 3,650,720 | 3/1972 | Grego et al. | 65/30 E |
| 3,779,732 | 12/1973 | Spanoudis | 65/31 |

FOREIGN PATENTS OR APPLICATIONS

| 1,082,064 | 9/1967 | United Kingdom | 65/30 E |

*Primary Examiner*—Robert L. Lindsay, Jr.
*Attorney, Agent, or Firm*—Frank R. Trifari; Daniel R. McGlynn

[57] ABSTRACT

A method of manufacturing colored pressed glass articles by indiffusion of ions under reducing conditions, in which method before the indiffusion a layer having a thickness of at least 10 $\mu$m is removed by etching with HF.

4 Claims, No Drawings

METHOD OF MANUFACTURING COLORED GLASS ARTICLES

This is a continuation, application Ser. No. 418,080, filed Nov. 21, 1973, now abandoned.

The invention relates to a method of manufacturing colored pressed glass articles.

It is known (see inter alia H. Tober in Glas-technische Berichte, 34, 456–460 (1961)) that glass articles which contain a reducing constituent can be given a red color by indiffusion of silver ions and consequent reduction of the silver ions to colloidal metal. This treatment is referred to in the art as staining. The silver generally is introduced in the form of a paste containing silver ions in the form of a sulphate, chloride, oxide or sulphide and furthermore ochre or iron oxide. The glass article is heated for some time in contact with the paste at a temperature slightly higher than the transformation temperature of the glass. At the said temperature the silver ions penetrate into the glass surface and color a layer having a thickness between 10 and 100 $\mu$m. Frequently the heat treatment is carried out in a reducing atmosphere, such as $SO_2$, for example, by adding solid sulphur to the paste. As a rule a reducing agent is added to the glass also. Especially arsenic trioxide or antimony oxide are used for this purpose; these additions have the advantage of acting as refining agents in the production of the glass. Other colors are obtainable by indiffusion of other ions, for example copper ions, or by using other conditions.

When staining glass articles made by pressing, it has been found that in many cases a pattern of light and/or dark stripes and patches is produced in the surface, which is unacceptable aesthetically.

It would appear that these stripes are due to inhomogeneities in the glass surface. One of the reasons thereof is the so-called cutting scar due to the cutting of the gob before pressing.

According to the invention before the pressed article is subjected to the staining treatment, it is exposed to the action of an etching liquid which contains hydrofluoric acid so that a surface layer of at least 10 $\mu$m is removed by etching.

Surprisingly it has been found that the removal of such a thin layer results in complete avoidance of the stripes and patches. An aesthetically satisfactorily evenly colored surface is obtained.

By way of illustration the invention will be further explained with reference to the following example.

Pressed face-plate panels for infrared radiators consisting of glass of the following composition, expressed in per cent by weight,

| | | | |
|---|---|---|---|
| $SiO_2$ | 77.4 | $Li_2O$ | 0.2 |
| $B_2O_3$ | 14.9 | $Al_2O_3$ | 1.5 |
| $Na_2O$ | 4.5 | F | 0.2 |
| $K_2O$ | 0.3 | $As_2O_3$ | 1.0 | are dipped for 2 minutes at room temperature in an etching liquid comprising a mixture of technically concentrated hydrofluoric acid and sulphuric acid in a proportion by volume of 4 to 1. As a result a layer of thickness about 20 $\mu$m is removed from the surface.

After rinsing the panels are stained in that their inner surfaces are coated with a paste containing

| | |
|---|---|
| 6.7 | kg of silver sulphate |
| 14.63 | kg of $MnO_2$ |
| 14.63 | kg of $Fe_2O_3$ |
| 19.8 | l of monoethylglycolether |
| 5.7 | l of acetone |
| 3.8 | l of a solution which contains 600 g nitrocellulose in a mixture of 12 l of monoethylglycolether and 480 ml of acetone |
| 1.52 | l of a solution of 1.5 kg of camphor in 2.5 l of xylene | and then heated at a temperature of 520° C for from 10–15 minutes.

As a result an even deep red color is obtained after the paste has been removed by washing.

I claim:
1. A method of manufacturing glass articles, comprising the steps of:
    providing a pressed glass face-plate panel for an infrared radiator consisting essentially of in percent by weight:

| | | | |
|---|---|---|---|
| $SiO_2$ | 77.4 | $Li_2O$ | 0.2 |
| $B_2O_3$ | 14.9 | $Al_2O_3$ | 1.5 |
| $Na_2O$ | 4.5 | F | 0.2 |
| $K_2O$ | 0.3 | $As_2O_3$ | 1.0 | subjecting the surface of said panel to the action of an etching solution containing hydrofluroic acid, so that a surface layer of at least 10 $\mu$m is removed by etching;
   coating said etched panel with a paste containing a silver compound; and
   heating said coated panel so as to diffuse ions from said paste into said panel under reducing conditions, thereby producing a red color in said panel.

2. A method as defined in claim 1, wherein said silver compound is silver sulphate.

3. A method as defined in claim 1, wherein said heating step is performed at a temperature of approximately 520° C for about 10 to 15 minutes.

4. A method as defined in claim 3, wherein said coating step comprises utilizing a paste consisting essentially of:

| | |
|---|---|
| 6.7 | kg of silver sulphate |
| 14.63 | kg of $MnO_2$ |
| 14.63 | kg of $Fe_2O_3$ |
| 19.8 | l of monoethylglycolether |
| 5.7 | l of acetone |
| 3.8 | l of a solution which contains 600 g nitrocellulose in a mixture of 12 l of monoethylglycoether and 480 ml of acetone |
| 1.52 | l of a solution of 1.5 kg of camphor in 2.5 l of xylene |

* * * * *